United States Patent
Rye et al.

(10) Patent No.: US 7,598,966 B2
(45) Date of Patent: Oct. 6, 2009

(54) METHODS AND SYSTEMS FOR AUTOMATICALLY RENDERING INFORMATION ON A DISPLAY OF A BUILDING INFORMATION SYSTEM

(75) Inventors: Jeffrey M. Rye, Roseville, MN (US); Thomas A. Plocher, Hugo, MN (US)

(73) Assignee: Honeywell International Inc., Morristown, NJ (US)

( * ) Notice: Subject to any disclaimer, the term of this patent is extended or adjusted under 35 U.S.C. 154(b) by 413 days.

(21) Appl. No.: 11/417,464

(22) Filed: May 3, 2006

(65) Prior Publication Data

US 2007/0257937 A1 Nov. 8, 2007

(51) Int. Cl.
*G06T 5/40* (2006.01)
(52) U.S. Cl. .................. 345/617; 345/629; 345/630; 345/639; 382/113; 382/274
(58) Field of Classification Search ................. 345/617, 345/639, 427, 629, 630; 382/113, 274
See application file for complete search history.

(56) References Cited

U.S. PATENT DOCUMENTS

| | | | |
|---|---|---|---|
| 5,448,696 A * | 9/1995 | Shimada et al. | 715/853 |
| 5,650,800 A * | 7/1997 | Benson | 345/173 |
| 6,181,321 B1 * | 1/2001 | Zhao et al. | 345/617 |
| 6,317,042 B1 * | 11/2001 | Engelhorn et al. | 340/539.16 |
| 6,681,140 B1 | 1/2004 | Heil | 700/95 |
| 6,809,642 B1 * | 10/2004 | Brenner | 340/506 |
| 6,889,473 B2 | 5/2005 | Westra | 52/64 |
| 6,938,232 B2 | 8/2005 | Saito et al. | 716/8 |
| 7,009,422 B2 | 3/2006 | Ting et al. | 326/41 |
| 7,016,794 B2 | 3/2006 | Schultz | 702/64 |
| 7,017,134 B2 | 3/2006 | Saito et al. | 716/10 |
| 7,277,018 B2 * | 10/2007 | Reyes et al. | 340/573.1 |
| 2003/0122845 A1 * | 7/2003 | Lee et al. | 345/589 |
| 2003/0198923 A1 | 10/2003 | Westra | 434/226 |
| 2003/0208692 A9 * | 11/2003 | Kimmel et al. | 713/201 |
| 2003/0229874 A1 | 12/2003 | Saito et al. | 716/8 |
| 2005/0138587 A1 | 6/2005 | Naum | 716/5 |
| 2007/0087311 A1 * | 4/2007 | Garvey et al. | 434/21 |

* cited by examiner

*Primary Examiner*—Kimbinh T Nguyen
(74) *Attorney, Agent, or Firm*—Kris T. Fredrick (57) ABSTRACT

A method, system and computer program product for automatically rendering information on a display screen of a building information system. Following generation of a plan image, such as a floor or site plan image, the plan image is modified and subsequently rendered on the display screen. The plan image is modified by adjusting the contrast ratio of the plan image such that, when graphical elements, such as icons representing elevators, evacuation stairways and fire hydrants, are rendered on the display screen overlaying the modified plan image, the graphical elements are visually distinct from the modified plan image.

20 Claims, 11 Drawing Sheets

```
min_brightness = 100%
max_brightness = 0%
for each pixel in the image
     min_brightness = min(min_brightness, pixel's brightness)
     max_brightness = max(max_brightness, pixel's brightness)

for each pixel in the image
     pixel's brightness =
          (desired_max_brightness - desired_min_brightness) *
          ((pixel's brightness - min_brightness) /
           (max_brightness - min_brightness)) +
          desired_min_brightness
```

*FIG. 11*

METHODS AND SYSTEMS FOR AUTOMATICALLY RENDERING INFORMATION ON A DISPLAY OF A BUILDING INFORMATION SYSTEM

TECHNICAL FIELD

Embodiments generally relate to information display methods and systems. Embodiments also relate to methods and systems for rendering information, such as a floor or site plan, on a display of a building information system, particularly a display screen of a first responder building information display system. Embodiments additionally relate to software or hardware modules for implementing such methods.

BACKGROUND OF THE INVENTION

Building information display systems are utilized by firefighters or other first responders to improve situation awareness at the fire ground. Current building information display systems are installed on site in lobby or reception areas of buildings and consist of a computer display system which is operable by the first responder to display the site or building information so that the first responder can make an initial assessment of the emergency situation and plan appropriate action.

The first responder building information display systems are configured to display floor or site plan images on a computer screen of the system together with information icons and other graphical elements representing building information such as elevator locations, evacuation stairways and fire hydrants located on the floor or site. Typically, the displayed floor or site plan includes background information as well as foreground information representing walls or pathways over which the graphical elements are superimposed or overlaid making it difficult in an emergency situation for the first responder to rapidly and accurately identify the building information on the floor or site plan.

There is need to provide a method and system for automatically rendering information on a display of a building information system which enables the user to identify all parts of the displayed information in a rapid and effective manner.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect to provide for an improved method for rendering information on a display of a building information system.

It is another aspect of the present invention to provide for an improved system for rendering information on a display of a building information display system.

The aforementioned aspects of the invention and other objectives and advantages can now be achieved as described herein.

According to one aspect, a method for automatically rendering information on a display screen of a building information system comprises providing a plan image, such as a floor or site plan image, modifying the plan image, and rendering the modified plan image on the display screen. The plan image can be modified by adjusting the contrast ratio of the plan image such that, when graphical elements, such as icons representing elevators, evacuation stairways and fire hydrants, are rendered on the display screen overlaying the modified plan image, the graphical elements are visually distinct from the modified plan image.

Advantageously, adjusting the contrast ratio of the plan image according to the aforementioned method enables the icons and other graphical elements to clearly stand out from the plan image and visual artifacts caused by high contrast are substantially reduced. A first responder viewing the display is able to easily and rapidly identify the important information associated with the site or floor plan, such as elevators, evacuations stairs, activated fire alarms and other building and/or emergency features, represented by the graphical elements so that the first responder can perform an initial assessment of the situation an efficient and effective manner. Adjusting the contrast ratio in the aforementioned manner can also facilitate easier identification of graphical icons displayed in other windows separate from the floor plan.

The contrast ratio can be adjusted by adjusting the brightness values of parts of the plan image according to a contrast ratio rule in order to reduce the contrast ratio of the plan image The plan image can comprise pixels for displaying on a digital or computer display in case the contrast ratio can be adjusted by (A) determining the brightness values (P) of the pixels including the minimum pixel brightness value ($P_{min}$) and maximum pixel brightness value ($P_{max}$), (B) selecting the desired minimum pixel brightness value ($D_{min}$) and the desired maximum pixel brightness value ($D_{max}$) of the plan image, (C) selecting a pixel having a brightness value to be adjusted, (D) determining a modified brightness value ($P_M$) for the selected pixel, the modified brightness value being determined as a function of P, $P_{min}$, $P_{max}$, $D_{min}$ and $D_{max}$, (E) assigning the modified brightness value ($P_M$) to the selected pixel, and repeating steps (C) to (E) until all pixels are adjusted. The modified brightness value can be determined according to $P_M = (D_{max} - D_{min}) * ((P - P_{min})/(P_{max} - P_{min})) + D_{min}$. Modified brightness values can be determined according to alternative equations for the purpose of adjusting the contrast ratio of the plan image in the aforementioned manner.

According to another aspect, a system for automatically rendering information on a display screen of a building information system has a processor and a memory coupled to the processor. A plan image of a building floor or site residing in memory. A contrast ratio program residing in memory for modifying the plan image, and a display, coupled to the processor and memory, the processor and memory being configured to display the modified plan image. When the contrast ratio program is executed by the processor, the program modifies the plan image by adjusting the contrast ratio thereof such that graphical elements rendered on the display overlaying the modified plan image are visually distinct from the modified plan image.

The graphical elements can represent building, emergency, and/or site information associated with the plan. The plan image preferably comprises pixels for displaying on a digital or computer display. The contrast ratio program has a pixel analyzer for determining the brightness values (P) of the plan image pixels. The pixel analyzer can be configured to determine the minimum pixel brightness value ($P_{min}$), the maximum pixel brightness value ($P_{max}$) and to select at least one pixel to be adjusted. The contrast ratio program also includes a rules engine for determining a modified brightness value for a particular selected pixel. The rules engine can be configured to receive P, $P_{min}$, $P_{max}$ a selected desired minimum brightness value $D_{min}$ and a selected desired maximum brightness value $D_{max}$. The contrast ratio program can further include a pixel adjuster for assigning the modified brightness value to the selected pixel.

When the contrast ratio program is executed on the processor, the rules engine determines, as a function of P, $P_{min}$, $P_{max}$, $D_{min}$ and $D_{max}$, a modified brightness value for each particular unadjusted pixel selected by the pixel analyzer and the pixel adjuster assigns the calculated modified brightness values to the selected pixels. The modified brightness value is preferably determined according to $P_M=(D_{max}-D_{min})*((P-P_{min})/(P_{max}-P_{min}))+D_{min}$.

A computer program product comprising: a computer-usable data carrier storing instructions that, when executed by a computer, cause the computer to perform a method of rendering information on a display screen of a building information system, the method comprising the steps of: providing a plan image, modifying the plan image, and rendering the modified plan image on the display screen, wherein modifying the plan image comprises adjusting the contrast ratio of the plan image such that, when graphical elements are rendered on the display screen overlaying the modified plan image, the graphical elements are visually distinct from the modified plan image.

BRIEF DESCRIPTION OF THE DRAWINGS

The accompanying figures, in which like reference numerals refer to identical or functionally-similar elements throughout the separate views and which are incorporated in and form part of the specification, further illustrate embodiments of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
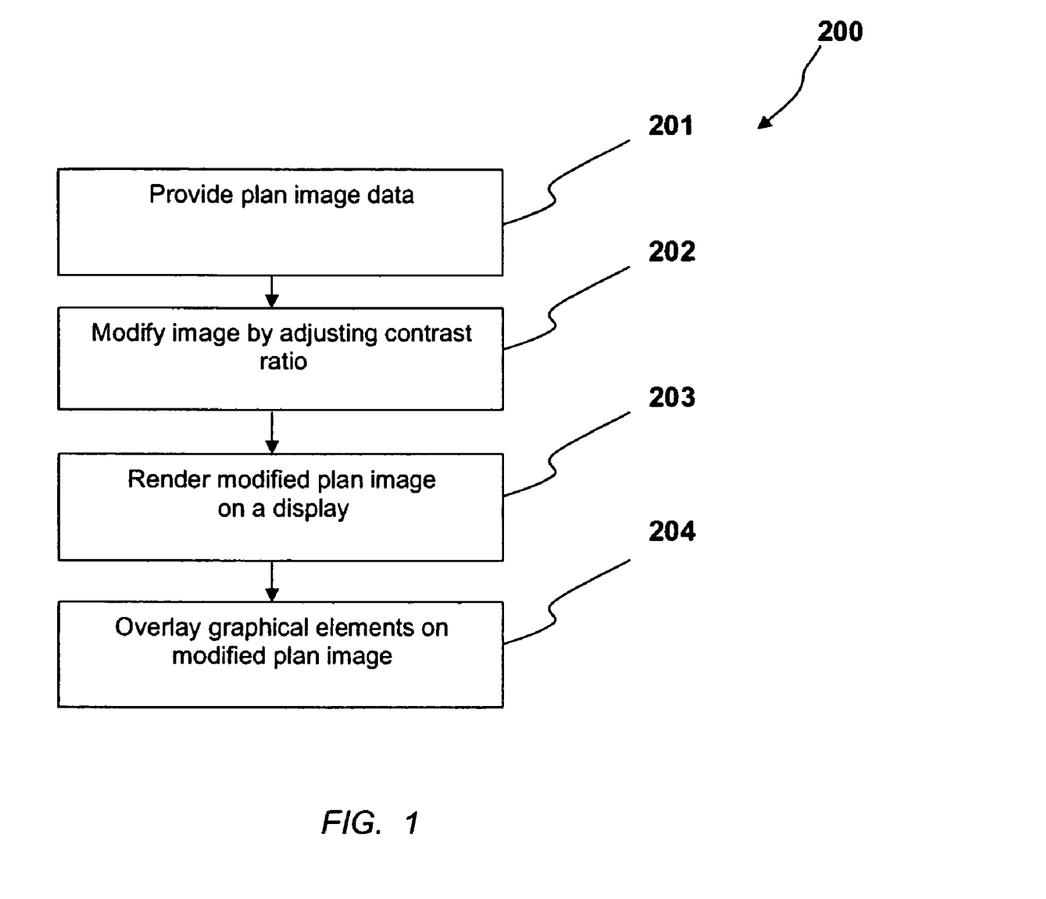
FIG. 1 illustrates a flow chart of operational steps of the general method of rendering information on a display of a building information system according to a preferred embodiment.

Referring to FIG. 1 of the accompany drawings, which illustrates a simplified flow chart of general operational steps which may be performed to implement the method for automatically rendering information on a display of a building information system according to one embodiment, as a general overview, a plan image, which can be for example a floor or site plan image, is generated, as indicated in step 201, which is subsequently modified by adjusting the contrast ratio of the plan image (step 202) preparatory to rendering the plan image on a display (step 203) together with graphical elements overlaying the modified plan image (step 204). The overlaid graphical elements represent important information associated with the plan image. As will be explained in more detail below, the contrast ratio of the plan image is adjusted such that the overlaid graphical elements are visually distinct from the modified plan image.

Advantageously, by adjusting the contrast ratio of the plan image so that the overlaid graphical elements are visually distinct from the modified plan image, a first responder or other user is able to rapidly and effectively identify the overlaid graphical elements.

In the illustrative embodiments shown in the accompanying figures the plan image is a floor or site plan and the overlaid graphical elements represent building information such as for example elevators, evacuations stairs, activated fire alarms and other building and/or emergency features. However the plan image and/or overlaid graphical elements may represent information other than building information. Also, in the illustrative embodiments, the plan image comprises picture elements, also known as pixels, arranged in bit maps for displaying the plan image on digital displays and computer displays. However, the plan image could alternatively comprise analogue or other types of signals for displaying the image on a screen.

Figure 2:
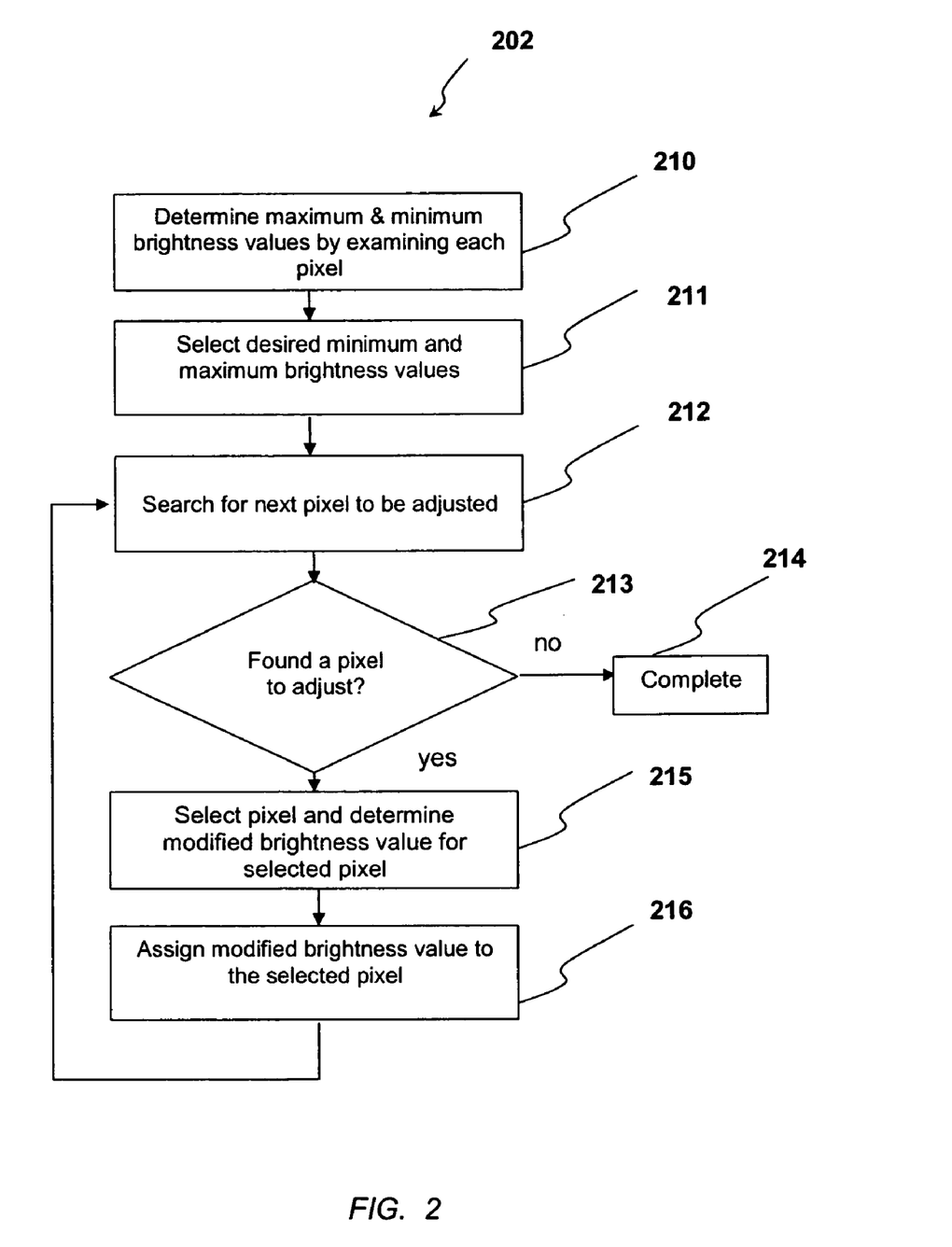
FIG. 2 illustrates the operational steps for performing the method step of adjusting the contrast ratio of the floor plan image shown in the process of FIG. 1.

Referring now to FIG. 2, which represents a flowchart depicting the logical operational steps according to one embodiment which may be followed to implement the method step of adjusting the contrast ratio indicated in FIG. 1, step 202 is initiated by examining the brightness value (P) of each pixel of the plan image in order to determine the maximum brightness value ($P_{max}$) and minimum brightness value ($P_{min}$) as indicated in step 210 of FIG. 2. Thereafter, the desired minimum brightness value ($D_{min}$) and maximum brightness value ($D_{max}$) of the plan pixels are selected as indicated in step 211. Steps 210 and 211 can be performed in any order. Thereafter, the pixels are scanned in search of a pixel whose brightness value is to be adjusted (step 212). If a pixel requiring adjustment is found, the pixel brightness value is selected for modification, as indicated in step 213, and a contrast ratio rule applied to determine the modified pixel brightness value (step 215).

The contrast ratio rule for modifying the brightness value $P_M$ of each pixel is expressed by the equation:

$$P_M=(D_{max}-D_{min})*((P-P_{min})/(P_{max}-P_{min}))+D_{min} \quad (1)$$

The modified brightness value $P_M$ of a selected pixel is determined by inputting brightness values $D_{min}$, $D_{max}$, $P_{min}$, $P_{max}$, & $P_b$ into Equation 1. Those skilled in the art would understand that alternative equations can be employed to adjust the modified brightness so that the contrast ratio of the plan image is adjusted such that the overlaid graphical elements are visually distinct from the modified plan image.

Thereafter, the selected pixel is assigned the modified brightness value, as indicated in step 216, and the pixels are subsequently scanned to determine the next pixel to be adjusted (step 212). Process steps 212-216 are repeated until the brightness value of each and every pixel is accordingly adjusted in which case there exist no further pixels to be adjusted and the method step 202 is complete as indicated in step 214.

Figure 3:
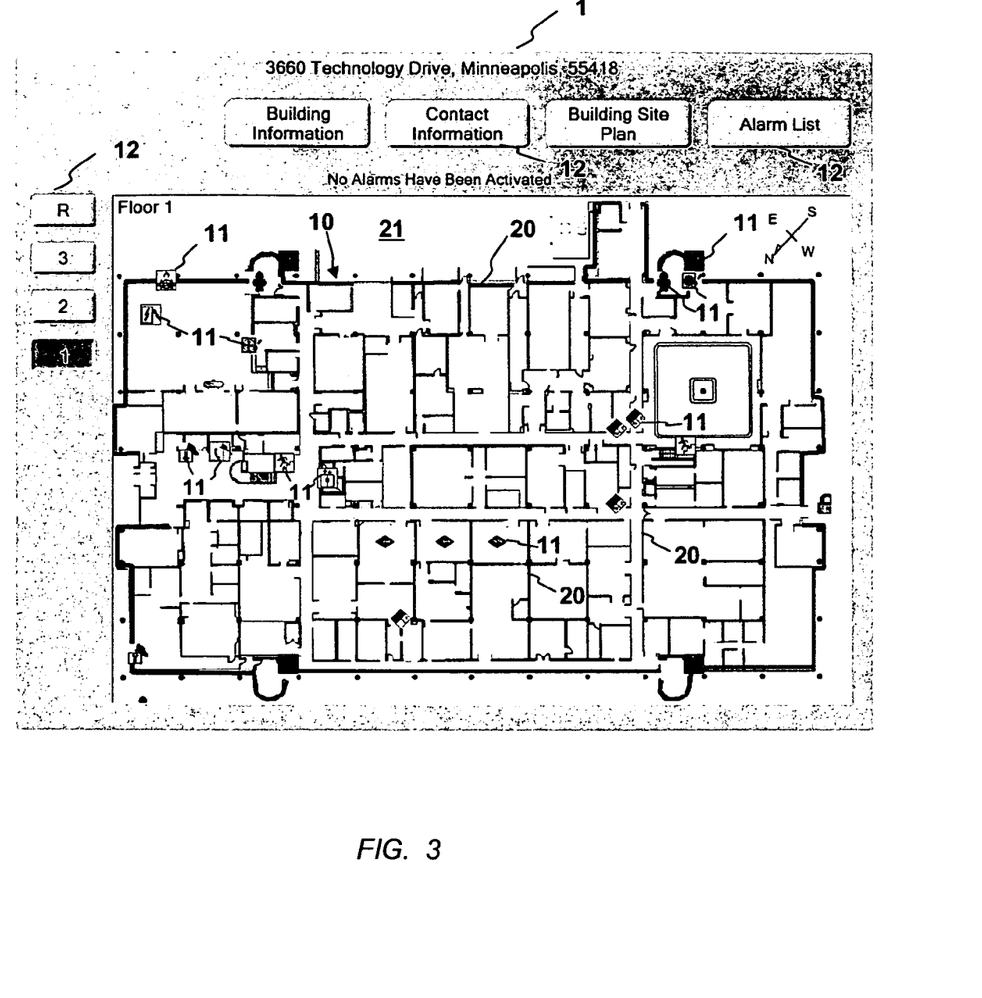
FIG. 3 illustrates a screen shot of a display of a first responder building information system displaying an unmodified floor plan and overlaid graphical elements.

An example of implementing the method for automatically rendering information on a display of a building information system will now be described according to an embodiment in which the building information system is a first responder information system and in which the plan image is a floor plan image having foreground information representing walls of the floor. FIG. 3 illustrates a typical screen shot 1 of a display of a first responder building information system displaying an unmodified floor plan image 10 overlaid with graphical elements 11 representing building information such as elevators and evacuation stairways located on the floor. Such building information can concern security and fire equipment, location of fire hydrants, standpipe and automatic sprinkler systems, and location of entrances to the building. Other information for display may include location of hazardous materials present in the building and details of persons occupying the building.

The unmodified floor plan image 10 has black lines or areas 20 representing the walls 20 and a white background 21 so that the brightness values of the wall pixels before modification are 0% (black) and the brightness values of the background pixels before modification are 100% (white). As shown in FIG. 3, the graphical elements 11 overlaying the floor plan 21 are not immediately visually distinguishable.

By way of example of the processes shown in FIGS. 1 & 2, let us assume the unmodified floor plan image 10 shown in FIG. 3 is provided in accordance with step 201. Thereafter, the contrast ratio of the floor plan image is modified by adjusting the contrast ratio of the floor plan (step 202) as follows. The floor plan image pixels are examined in accordance with process step 210 and the minimum and maximum brightness values $P_{min}$, $P_{max}$ among all the pixel brightness values are determined to be 0% (black) and 100% (white), respectively. Let us also assume, the minimum and maximum pixel brightness values ($D_{min}$, $D_{max}$) are selected in accordance with step 210 as 50% (grey) and 100% (white), respectively.

The modified brightness value $P_M$ of a wall pixel selected in accordance with step 212 can be determined by applying equation (1) as follows:

$$P_M = (100-50)*((0-0)/(100-0))+50=50\%$$

Also, the modified brightness value of a selected background pixel can be determined by applying equation (1) as follows:

$$P_M = (100-50)*((100-0)/(100-0))+50=100\%$$

Figure 4:
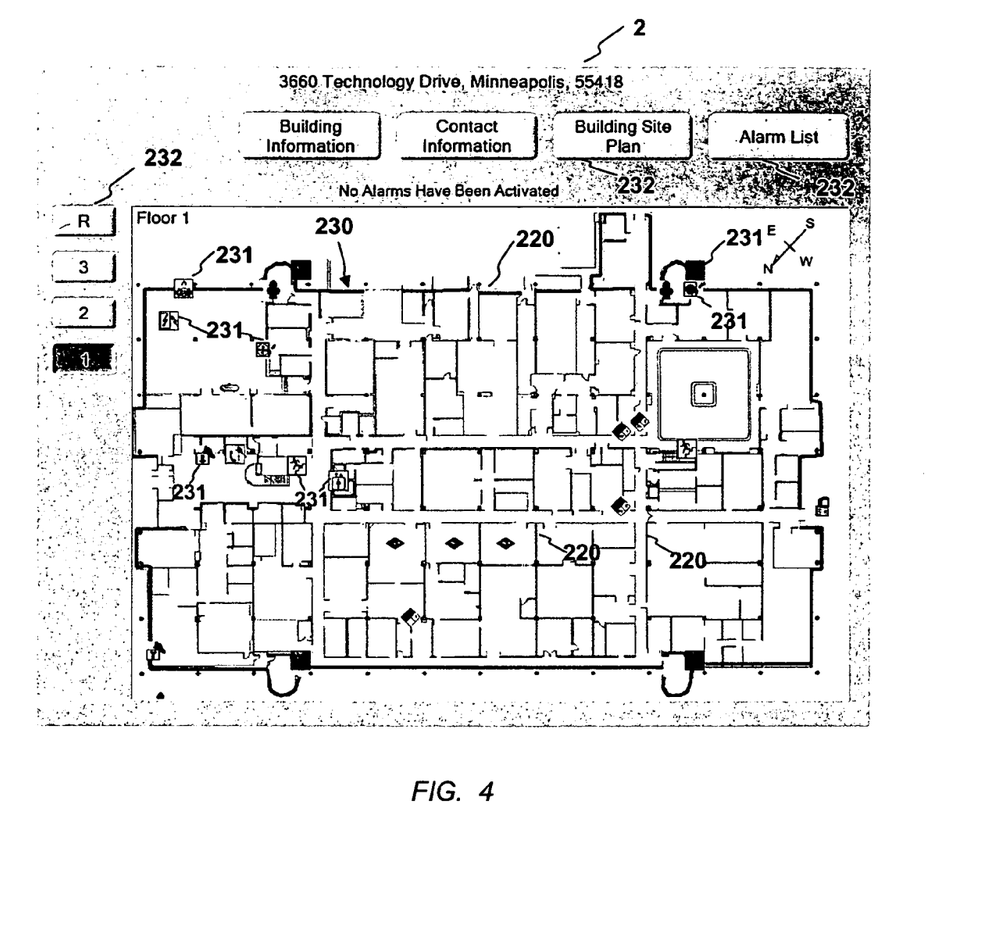
FIG. 4 illustrates the same screen shot shown in FIG. 3 but with the floor plan image modified according to the process indicated in FIG. 2 in which the selected minimum and maximum brightness values are 50% & 100%, respectively.

Prior to rendering the floor plan image on the display, process steps 212-216 are repeated until all pixels have been assigned their respective modified brightness values. As a result, the floor plan image is adjusted so that the brightest part is 100% brightness and the darkest part is at 50% brightness. The modified floor plan 230 is then displayed on the screen and the graphical elements 231 overlaid on the displayed modified floor plan image as shown in FIG. 4 which illustrates the a screen shot 2 which is identical to screen shot 1 of FIG. 3 but showing the floor plan image modified by adjusting the brightness values of the wall pixels and background pixels to 50% and 100% brightness, respectively. The graphical elements 231, 232 are identical to the graphical elements 11, 12 of FIG. 3.

As can be seen from FIG. 4, adjusting the contrast ratio of the floor plan according to the processes 202 of FIG. 2, results in the graphical elements 231 being visually distinct from the modified floor plan 230. The contrast ratio of the floor plan is reduced so that the icons and other graphical elements 231 clearly stand out from the floor plan image and visual artifacts caused by high contrast are substantially reduced. The first responder viewing the display of FIG. 4 is therefore able to easily and rapidly identify the important information associated with the site or floor plan, such as for elevators, evacuations stairs, activated fire alarms and other building and/or emergency features, represented by the graphical elements so that the first responder can perform an initial assessment of the situation an efficient and effective manner. Adjusting the contrast ratio in the aforementioned manner can also facilitate easier identification of graphical icons 232 displayed in other windows separate from the floor plan.

Figure 9:
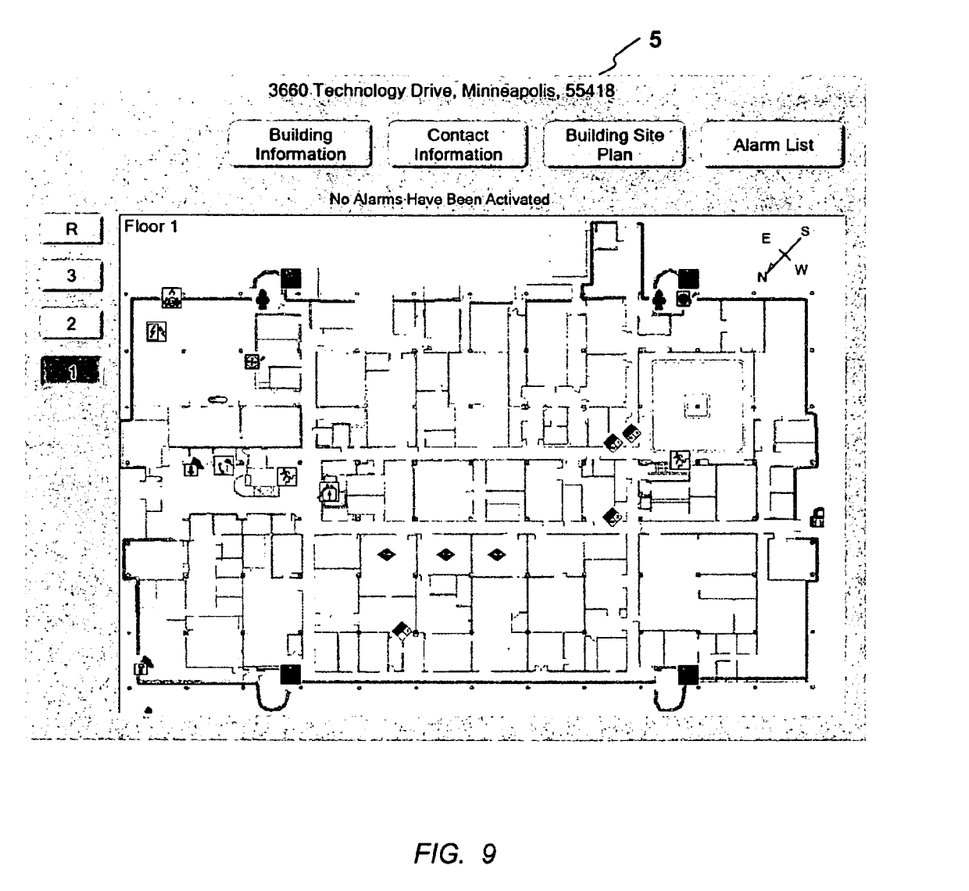
FIGS. 9 & 10 illustrate the same screen shots shown in FIGS. 3 & 7 but with the desired minimum and maximum brightness values selected at 70% and 100%, respectively.

For black walls on a white background, reducing the contrast ratio between the walls and background according to the method shown in FIG. 2 will lighten the picture so that background is still white and the walls are gray. The 100% and 50% thresholds are arbitrary, they could be adjusted higher or lower. For example, FIG. 9 shows a screen shot 5, which is identical to the screen shot 1 of FIG. 4 save that the desired minimum and maximum brightness values have been selected at 70% and 100% brightness, respectively. The processes 202 of FIG. 2 also take an image with a light-gray background and dark-gray walls and adjust it so that the background is white and the walls are dark gray.

Figure 7:
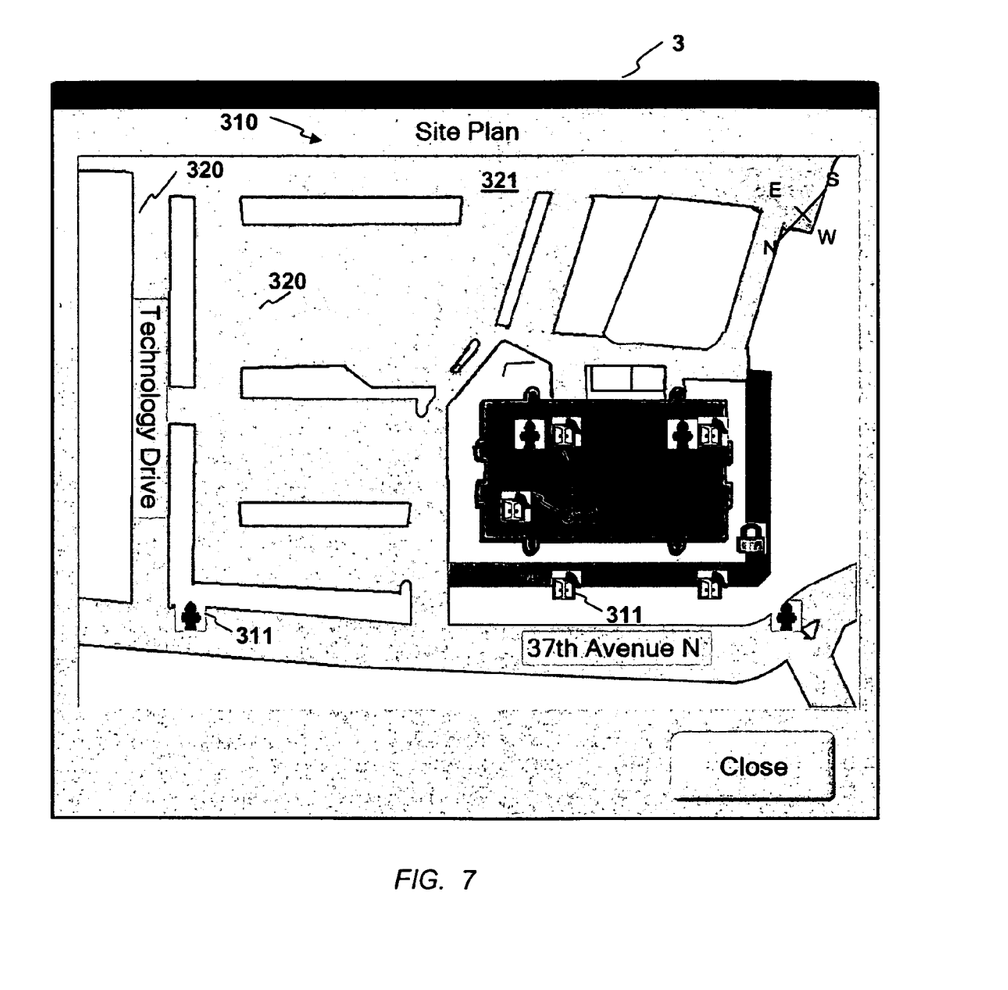
FIGS. 7 and 8 illustrate screen shots of the display of the first responder building information system displaying an unmodified site plan and a modified site plan, respectively, overlaid with graphical elements.
Figure 8:
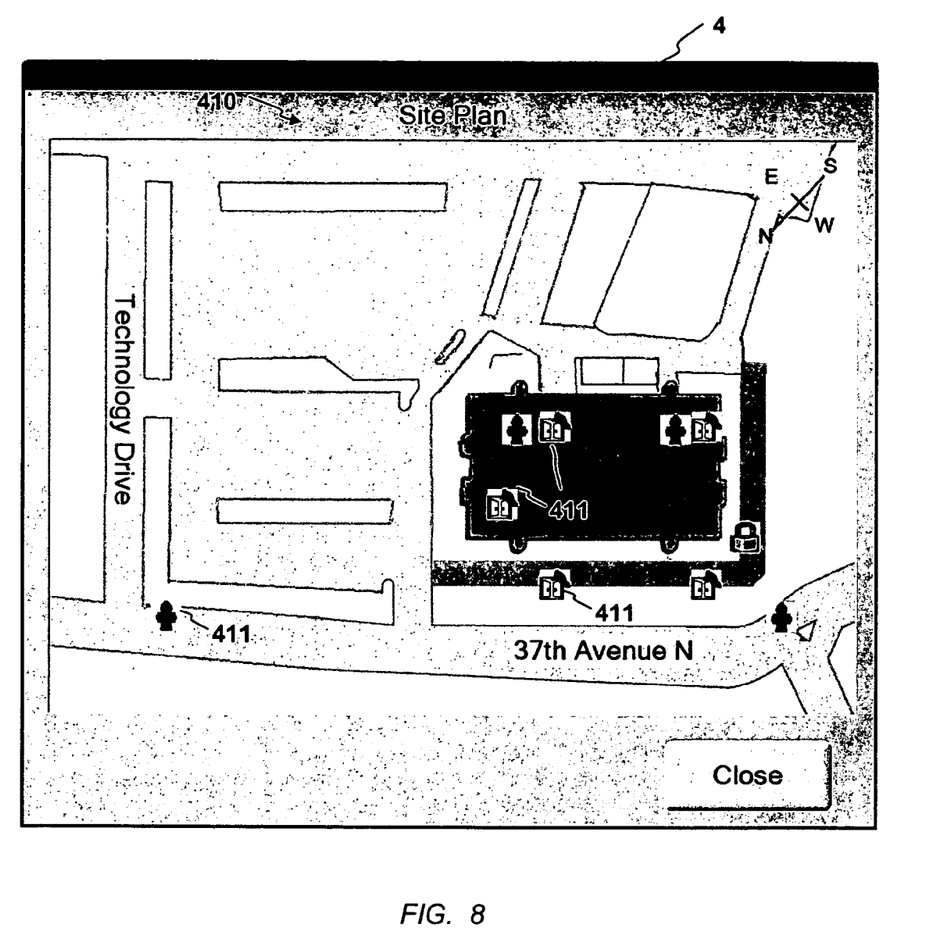
Figure 10:
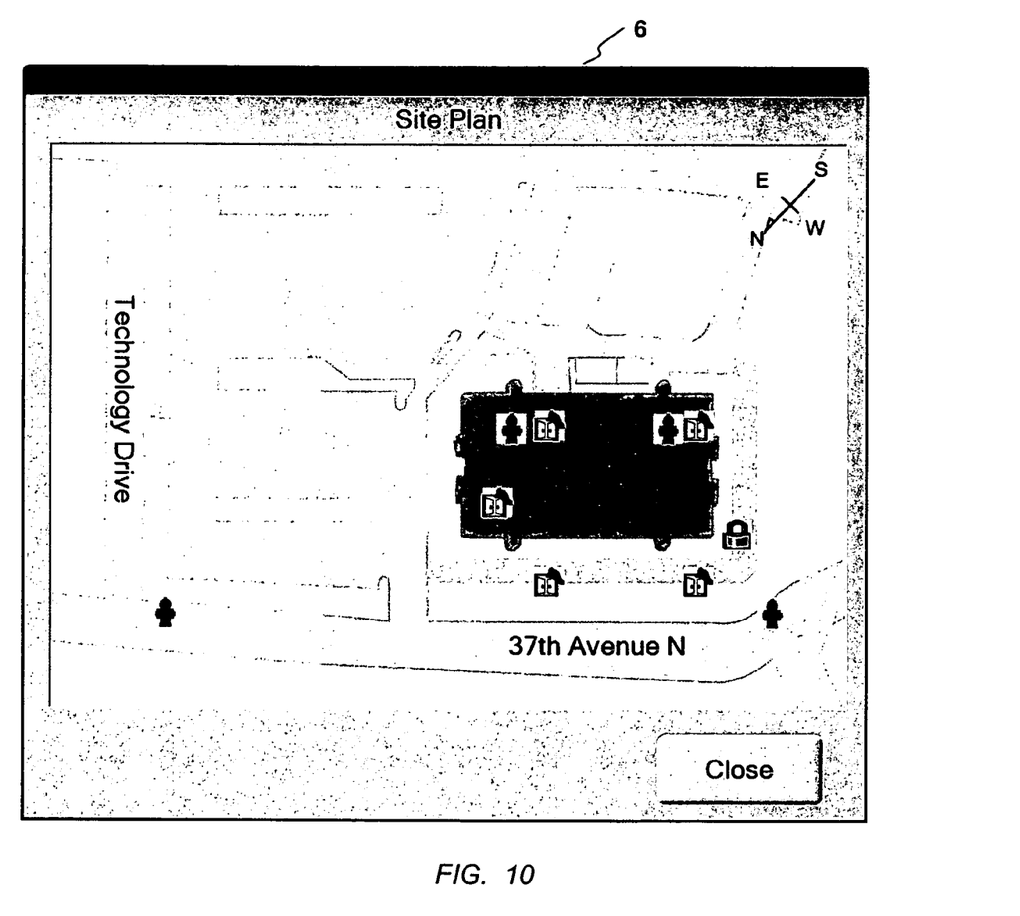

According to another embodiment, the plan image to be modified according to the processes 202 of FIG. 2, is a plan image of a site in which the foreground information represents roads of pathways. FIGS. 7 & 8 illustrate typical screen shots 3, 4 of the site plan image before and after image modification according to one embodiment, respectively, and overlaid graphical elements representing site information. As seen in FIG. 7, the site plan 310 includes roads/pathways 320 on a background 321 and the graphical elements 311 represent fire hydrants and other site information. Note that the unadjusted brightness values of the pixels of the site plan image range from about 3% (very dark) to 95% (very light). The site plan image 410 of screen shot 4 of FIG. 8 is identical to site plan 310 shown in FIG. 7 but has been adjusted using desired minimum and maximum brightness values of 50% & 100%. The graphical elements 411 shown in screen shot 4 are identical to graphical elements 311 shown in screen shot 3. FIG. 10 illustrates a screen shot 6 which is identical to the screen shot 3 shown in FIG. 7 but with the desired minimum and maximum brightness values selected at 70% and 100%, respectively.

Figure 11:
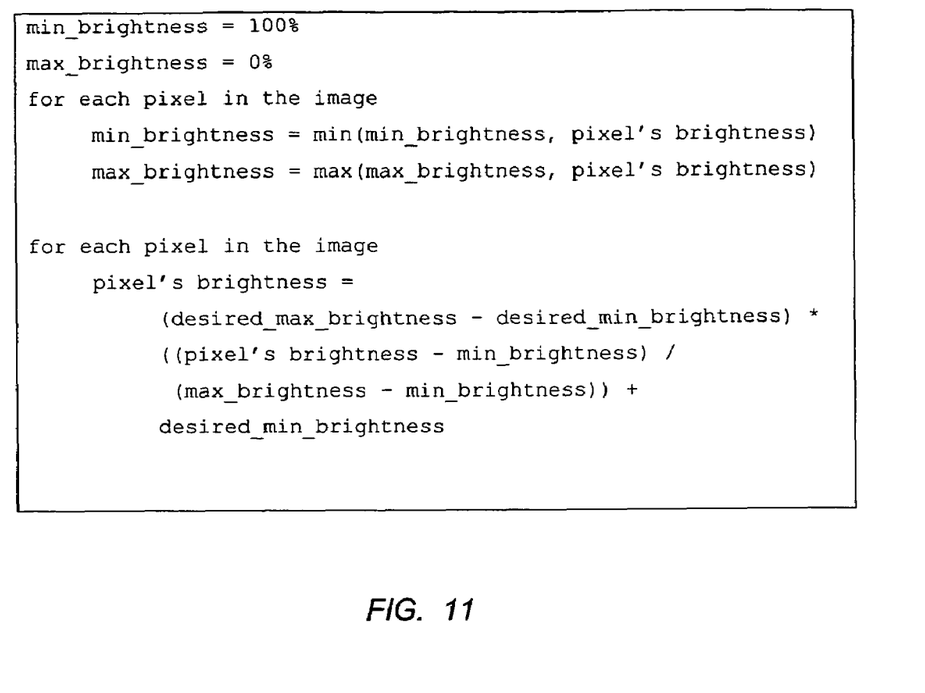
FIG. 11 illustrates an example of an algorithm for adjusting the contrast ratio of the plan image shown in FIG. 3.

According to another embodiment, each pixel can consist of color components, preferably the hue, saturation, and value components of a HSV or like color scheme. Equation (1) is then applied to just the brightness value in an HSV color scheme, so that hues are preserved. It could also be applied so that the resulting pixels are monochrome with only a brightness value. Equation (1) can be used to adapt an image by swapping darkness and lightness while shifting the colors. The transformation is best illustrated by the algorithm set forth in FIG. 11. Pixel information in a RGB (Red, Green, and Blue) color scheme can be converted to a HSV scheme for the purpose of modifying the plan image.

Figure 5:
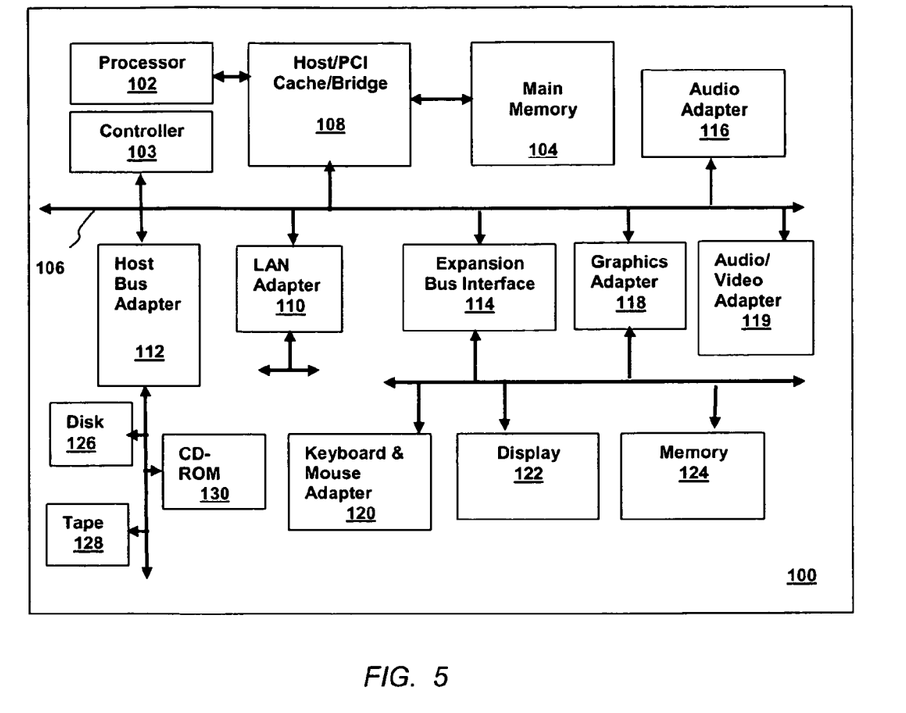
FIGS. 5 & 6 illustrate block diagrams of electronic automated systems in which the method of rendering information on a display of a building information system can be implemented according to various embodiments.

A block diagram showing typical architecture of an electronic automated system in which the processes of FIGS. 1 & 2 can be implemented according to one embodiment is illustrated in FIG. 5. The depicted example is not meant to imply architectural limitations with respect to embodiments, but is presented for general illustrative and edification purposes only.

As shown in FIG. 5, electronic automated system 100 can employ a peripheral component interconnect (PCI) local bus architecture. Although the depicted example employs a PCI bus, other bus architectures such as Micro Channel and ISA may be used. The processor 102 and a main memory 104 can be connected to PCI local bus 106 through PCI Bridge 108. PCI Bridge 108 also may include an integrated memory controller and cache memory for processor 102. Alternatively, a controller 103 can communicate with PCI local bus 106 to provide additional architectural support. Controller 103 may be utilized in place of to complement an integrated memory controller and cache memory for processor 102. A display 122 is coupled to the processor 102 and memory 104.

Additional connections to PCI local bus 106 may be made through direct component interconnection or through add-in boards. In the depicted example, local area network (LAN) adapter 110, host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, display 122 and additional memory 124. Host bus adapter 112 provides a connection for hard disk drive 126, tape drive 128, and CD-ROM 130 in the depicted example.

Typical PCI local bus implementations will support three or four PCI expansion slots or add-in connectors. The depicted example includes four loads on the mother board and three expansion slots. Those of ordinary skill in the art will appreciate that the hardware in FIG. 5 may vary. For example, other peripheral devices, such as optical disc drives and the like may be used in addition to or in place of the hardware depicted in FIG. 5.

Figure 6:
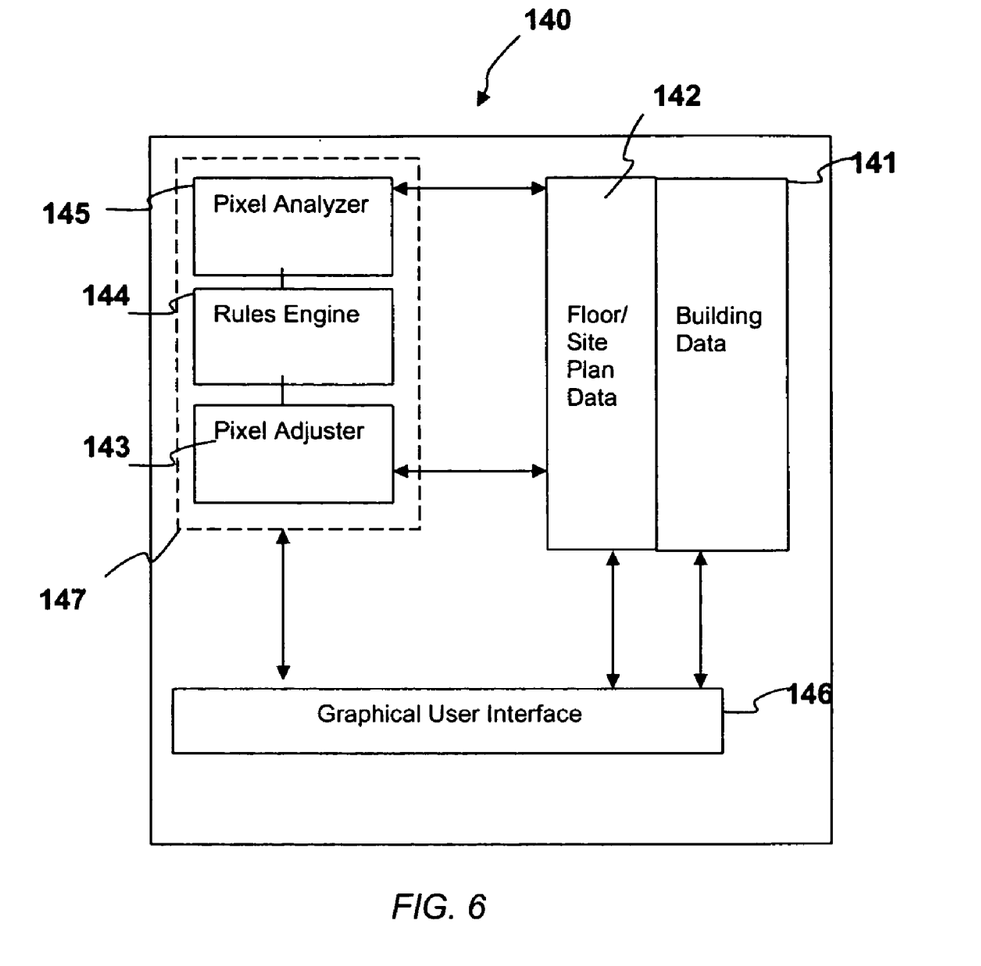

In one particular embodiment, the electronic automated system is configured as a first responder building and emergency information display system 140 as shown in a simplified block diagram form in FIG. 6. The first responder information display system is utilized in fire, medical or police emergency response applications for providing real time building and emergency information to incident command and/or dispatch centers. The first responder information display system 140 can be, for example, a computer system having a high-resolution screen located at dispatch centers, a hand held device, a wireless device operably connected to a notebook or other computers, or an embedded computer utilized in police vehicles or in fire fighting apparatus, such as a fire panel. One such first responder information system is "FirstVision" supplied by Honeywell International Inc, 101 Columbia Road Morristown, N.J. 007962 and consisting of an embedded computer having a touch-screen monitor running FirstVision software.

As a general overview, plan image data representing a floor or site 142, building information data 141 and a contrast control module 147 for modifying the plan image according to processes of FIGS. 1 & 2, reside in memory which is operably linked via communication buses to a graphical user interface 146, also residing in memory, for displaying the modified plan image and overlaying the graphical elements representing the building information. When a contrast control program of the module 147 is executed by the system, the program modifies the plan image data 142 by adjusting the contrast ratio between the background and the foreground information according to process steps 202 such that the graphical elements rendered on the display, overlaying the modified plan image, are visually distinct from the modified plan image.

In the illustrative embodiment shown in FIG. 6, the contrast control module contains computer programs adapted and arranged to run an algorithm for carrying out the process steps 202 shown in FIG. 2. However, the module 147 may be in the form of software or hardware. The module can be run locally on the information display system or run from a remote location via a network coupled to the display system. A person skilled in the art would know that there are multiple modes of implementing such a module.

Control software and hardware (not shown) associated with the graphical user interface 146 which generally controls the communication of the pixel data from memory to the display so that the modified floor plan and overlaying building information can be correctly displayed on the display screen of the graphical user interface is known in the art and will not be described in detail here.

As shown in FIG. 6, the contrast control module 147 contains computer programs which function as a pixel analyzer 145, a rules engine 144 and a pixel adjuster 143. The contrast control module 147 is configured to operate on the pixel data 142 representing the floor plan so as to adjust the contrast ratio of the floor plan preparatory to the floor plan being displayed on the graphical interface in conjunction with other building information images and or text.

Pixel analyzer 143 is configured to scan each and every pixel of the floor plan stored in memory to determine the maximum and minimum pixel brightnesses $P_{max}$, $P_{min}$ among all the floor plan pixels and to select pixels requiring adjustment. The desired minimum and maximum brightness values ($D_{min}$, $D_{max}$) of the floor plan are inputted via the graphical user interface by the user, either prior to or during execution of the contrast ratio program, and stored in memory as required. Rules engine 144 is arranged to apply equation (1) to determine the modified brightness value of a particular selected pixel.

Preferably, the floor pixel data 142 can be in an HSV color scheme format and the pixel analyzer 143 can be configured to apply the general algorithm or equation (1) to just the brightness value in an HSV color scheme, so that hues are preserved. It could also be applied so that the resulting pixels are monochrome with only a brightness value.

A method of operating the first responder building information system of FIG. 6 will now be described according to one embodiment. Initially, building information is downloaded into the system 140 by a user, for example either off site prior to a first responder arriving at the building or on site from computer management system located in the building itself, as is known in the art.

In response to the user activating the graphical user interface 146 to display a selected floor plan, the contrast control module 147 is activated causing the pixel analyzer 145 to scan the floor plan pixel data 142 and determine the minimum and maximum pixel brightnesses ($P_{min}$, $P_{min}$) among all the pixels. The analyzer then scans the pixels and selects a pixel whose brightness value requires adjusting. Using the determined minimum and maximum pixel brightnesses and the preset desired min and maximum pixel brightnesses ($D_{min}$, $D_{max}$), the rules engine 144 applies the equation (1) to calculate the modified brightness value for the selected pixel and the pixel adjuster 143 assigns the calculated modified brightness value to the selected pixel. The desired minimum and maximum pixel brightnesses can be preset in memory associated with the contrast control module and read by the rules engine.

The information system 140 then displays the modified floor plan and overlays associated building information on the display screen of the graphical user interface 146 thereby enabling the first responder to display the information needed to perform an initial assessment of a situation and form a plan of action.

Those skilled in the art would understand that the illustration of FIG. 6 is merely depicting one example of the embodiments and that the embodiments are not limited thereto. In alternative embodiments, the brightness control system may be implemented in electronic automated systems other than emergency response systems whilst taking the form of stand-alone computer systems, networked computers or other data processing systems.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A method for automatically rendering information on a display screen of a building information system, said method comprising:
    providing a plan image;
    modifying said plan image;
    rendering said modified plan image on said display screen; and
    rendering graphical elements on said display screen overlaying said modified plan image, said overlaid graphical elements representing building, emergency, and/or site information associated with said plan image;
    wherein modifying said plan image comprises reducing contrast ratio of said plan image such that said graphical elements, rendered on said display screen overlaying said modified plan image, are visually distinct from said modified plan image.

2. The method of claim 1, wherein reducing said contrast ratio comprises:
    adjusting brightness values of parts of said plan image according to a contrast ratio rule in order to reduce the contrast ratio of said plan image.

3. The method of claim 1, wherein said plan image comprises pixels for displaying on a digital or computer display.

4. The method of claim 3, wherein reducing said contrast ratio comprises
    (A) determining the brightness values (P) of the pixels including a minimum pixel brightness value ($P_{min}$) and maximum pixel brightness value ($P_{max}$);
    (B) selecting a desired minimum pixel brightness value ($D_{min}$) and a desired maximum pixel brightness value ($D_{max}$) of said plan image;
    (C) selecting a pixel having a brightness value to be adjusted;
    (D) determining a modified brightness value ($P_M$) for said selected pixel, said modified brightness value being determined as a function of P, $P_{min}$, $P_{max}$, $D_{min}$ and $D_{max}$;
    (E) assigning said modified brightness value ($P_M$) to said selected pixel, and repeating said steps (C) to (E) until all pixels are adjusted.

5. The method of claim 4, wherein said modified brightness value is determined according to $P_M=(D_{max}-D_{min})*((P-P_{min})/(P_{max}-P_{min}))D_{min}$.

6. The method of claim 3, wherein said plan image comprises a building floor or site plan image.

7. The method of claim 1, wherein said provided plan image comprises walls and a background, and wherein reducing said contrast ratio of said plan image comprises reducing the contrast ratio between said walls and said background.

8. A system for automatically rendering information on a display screen of a building information system, comprising:
    a processor;
    a memory coupled to the processor;
    a plan image residing in memory;
    a contrast ratio program residing in memory for modifying said plan image; and
    a display, coupled to the processor and memory, said processor and memory being configured to display said modified plan image;
    whereby, when said contrast ratio program is executed by said processor, said program modifies said plan image by reducing contrast ratio thereof such that graphical elements, rendered on said display overlaying said modified plan image, are visually distinct from said modified plan image, said graphical elements representing building, emergency, and/or site information associated with said plan image.

9. The system of claim 8, wherein said plan image comprises pixels for displaying on a digital or computer display.

10. The system of claim 9, wherein said contrast ratio program comprises a pixel analyzer for determining a brightness values (P) of said plan image pixels, said pixel analyzer being configured to determine a minimum pixel brightness value ($P_{min}$), a maximum pixel brightness value ($P_{max}$) and to select at least one pixel to be adjusted;
    a rules engine for determining a modified brightness value for a particular selected pixel, said rules engine being configured to receive P, $P_{min}$, $P_{max}$ a selected desired minimum brightness value $D_{min}$ and a selected desired maximum brightness value $D_{max}$; and
    a pixel adjuster for assigning said modified brightness value to said pixel;
    whereby, when said contrast ratio program is executed on said processor, said rules engine determines, as a function of P, $P_{min}$, $P_{max}$, $D_{min}$ and $D_{max}$, a modified brightness value for each particular unadjusted pixel selected by said pixel analyzer and said pixel adjuster assigns said determined modified brightness values to said selected pixels.

11. The method of claim 10, wherein said modified brightness value is determined according to $P_M=(D_{max}-D_{min})*((P-P_{min})/(P_{max}-P_{min}))D_{min}$.

12. The method of claim 11, wherein said plan image comprises a floor or site plan image.

13. The system of claim 8, wherein said provided plan image comprises walls and a background, and wherein reducing said contrast ratio of said plan image comprises reducing the contrast ratio between said walls and said background.

14. A computer program product comprising: a computer-usable data carrier storing instructions that, when executed by a computer, cause the computer to perform a method of rendering information on a display screen of a building information system, said method comprising:
    providing a plan image;

modifying said plan image;

rendering said modified plan image on said display screen; and rendering graphical elements on said display screen overlaying said modified plan image, said overlaid graphical elements representing building, emergency, and/or site information associated with said plan image;

wherein modifying said plan image comprises reducing contrast ratio of said plan image such that said graphical elements, rendered on said display screen overlaying said modified plan image, are visually distinct from said modified plan image.

15. The product of claim 14, wherein said plan image comprises a floor or site plan.

16. The product of claim 14, wherein said provided plan image comprises walls and a background, and wherein reducing said contrast ratio of said plan image comprises reducing the contrast ratio between said walls and said background.

17. The product of claim 14, wherein reducing said contrast ratio comprises:

adjusting brightness values of parts of said plan image according to a contrast ratio rule in order to reduce the contrast ratio of said plan image.

18. The product of claim 14, wherein said plan image comprises pixels for displaying on a digital or computer display.

19. The product of claim 18, wherein reducing said contrast ratio comprises (A) determining the brightness values (P) of the pixels including a minimum pixel brightness value ($P_{min}$) and maximum pixel brightness value ($P_{max}$);

(B) selecting a desired minimum pixel brightness value ($D_{min}$) and a desired maximum pixel brightness value ($D_{max}$) of said plan image;

(C) selecting a pixel having a brightness value to be adjusted;

(D) determining a modified brightness value ($P_M$) for said selected pixel, said modified brightness value being determined as a function of P, $P_{min}$, $P_{max}$, $D_{min}$ and $D_{max}$;

(E) assigning said modified brightness value ($P_M$) to said selected pixel, and repeating said steps (C) to (E) until all pixels are adjusted.

20. The product of claim 19 wherein said modified brightness value is determined according to $P_M=(D_{max}-D_{min})*((P-P_{min})/(P_{max}-P_{min}))D_{min}$.

* * * * *